April 17, 1934.  W. F. BLUE  1,955,667
AMUSEMENT APPARATUS
Filed Jan. 17, 1933
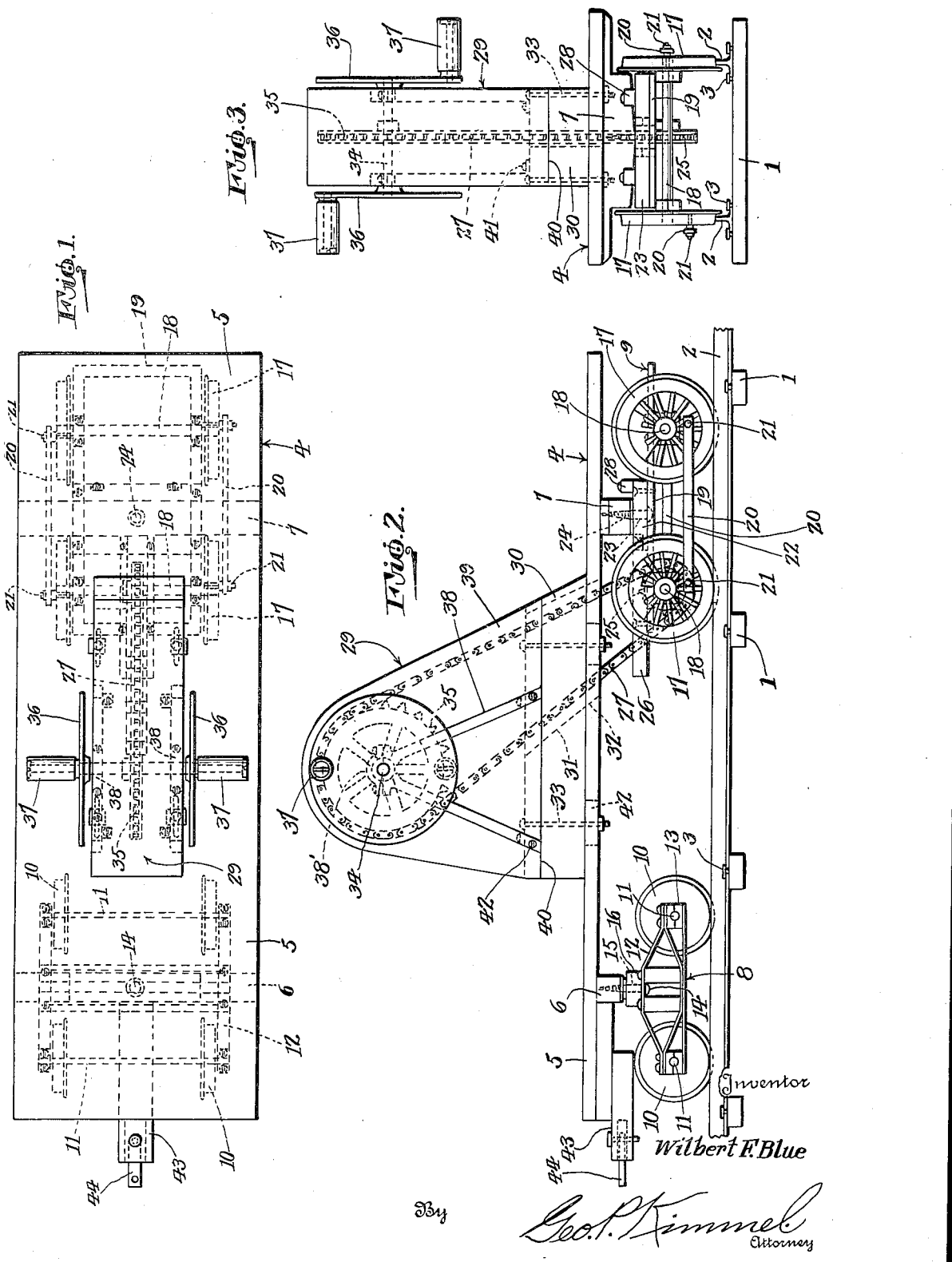
Inventor
Wilbert F. Blue
By
Geo. F. Kimmel
Attorney Patented Apr. 17, 1934

1,955,667

UNITED STATES PATENT OFFICE 1,955,667

AMUSEMENT APPARATUS

Wilbert F. Blue, Montezuma, Ind.

Application January 17, 1933, Serial No. 652,214

6 Claims. (Cl. 105—89)

This invention relates to an amusement apparatus for children at fairs, carnivals, parks or other places of amusement, and has for its object to provide, in a manner as hereinafter set forth, an amusement apparatus including a car and a fixed track, and with the car including means operated by the hand power of a child seated thereon for the purpose of propelling the car over the track thus affording amusement, recreation and healthful exercise to the child.

Further objects of the invention are to provide, in a manner as hereinafter set forth, an amusement apparatus which is comparatively simple in its construction and arrangement, strong, durable, amusing to a child when used, and comparatively inexpensive to manufacture.

To the above ends essentially and to others which may hereinafter appear, the invention consists of such parts and such combination of parts which fall within the scope of the invention as claimed.

In the drawing:

Figure 1 is a top plan view of the car forming one of the elements of the apparatus.

Figure 2 is a side elevation of the apparatus with the track, the other element of the apparatus being broken away.

Figure 3 is a front end view of the apparatus.

The apparatus includes a set of spaced sleepers or ties 1, upon which a pair of inverted T-shaped rails 2, are secured in parallel spaced relation by spikes 3 to provide a track on which a car referred to generally at 4 travels.

The car includes a flat oblong member 5 constituting a seat for the child. Connected against the lower face of member 5 at a point between its transverse median and leading end is a bolster 6, and secured against the lower face of member 5 between its transverse median and follower end is a bolster 7.

The bolsters 6, 7 are connected to leading and driving trucks 8, 9 respectively.

The truck 8 is of a design similar to an arch bar type of railway truck and comprises two spaced pairs of flanged wheels 10 for traveling on the rails 2. The wheels of each pair are pressed upon an axle 11. The frame of the truck 8 is indicated at 12 and which has secured thereto bearings 13 for the axles 11. The truck 8 is held in place by a king pin 14 which extends through an opening 15 provided in the truck transom 16. The pin 14 is anchored in the bolster 6. The truck 8 is free to turn about the pin 14 so the truck will operate on a curved or tangent track.

The truck 9 is of a design similar to that of a four wheel railway locomotive drive truck and it comprises two spaced pairs of flanged wheels 17 for traveling on the rails 2. The wheels 17 of each pair are pressed upon an axle 18. The frame of truck 9 is indicated at 19 and which has secured thereto bearings 20 for the axles 18. The wheels 17 of one pair is connected to wheels 17 of the other by a pair of coupling rods 20 arranged at the sides of truck 9, and the rod on one side is exactly 90 degrees opposite the rod on the other side. Studs 21 are provided on wheels 17 for pivotally connecting the rods to the latter. The transom of truck 9 is designated 22 and is formed with an opening 23 through which extends a king pin 24. The latter is anchored at its upper end on bolster 7. The leading axle of truck 9 is provided centrally thereof with a sprocket pinion 25. Attached to the frame 19 and to transom 22, as well as extending forwardly from the latter is a chain guide 26. Operating the pinion 25 for the purpose of driving truck 9 and passing through guide 26 is an upstanding driven endless sprocket chain 27. The arrangement of pin 24 with respect to transom 22 permits of truck 9 to turn about pin 24 so the truck will operate on a curved or tangent track. The leading axle of the truck 9 is termed a drive axle. A pair of spaced stops 28 are secured to transom 22 and will strike the bolster 7 when truck 9 turns on pin 24 through a certain predetermined axle. This angle is approximately 8 degrees when measured between the center line of the car and the center line of the truck and is considered the maximum angle of swing which is practicable for good operating conditions. This means that the minimum radius of curvature for the track under the above mentioned conditions will be six feet, (measured at the inside rail of the curved track). The position of the drive truck 9 with respect to the body bolster 7 is such that more car weight is distributed on the drive axle 18 than on the other axle 18. This is effected by making the distance from the king pin 24 to the drive axle 18 approximately ½ inch less than the distance from the king pin 24 to the other axle 18. The additional weight thus placed on the drive axle 11 as compared with the weight on the other axle 18 will tend to be equalized by an upward force which is caused by the pull of the chain 27 on the sprocket wheel 25 and the drive axle 18 when the car is being propelled.

Mounted on the member 5 intermediate the ends of the latter is a drive head assembly indicated generally at 29, and comprising a foundation block 30 formed with a slot 31 which registers with a slot 32 provided in member 5. The block 30 is anchored upon member 5 by the holdfast means 33. Arranged above block 30 is a shaft 34 carrying centrally thereof a fixed sprocket wheel 35. The end of shaft 34 has fixed thereto circular discs 36, each having eccentrically connected thereto a handle 37. One handle on one disc is disposed exactly 180 degrees from the handle on the other disc. The chain 27 is driven from sprocket wheel 35 and the latter is of materially greater diameter than pinion 25. Secured to the block 30 is a pair of upstanding inverted V-shaped brackets 38 provided with bearings 38' for the shaft 34. The discs 36 are arranged upwardly with respect to the brackets 38. The sprocket wheel 35 and chain 27 are enclosed by a hood 39 which extends around the upper portion of block 30. The hood provides protection against a child placing its fingers in the sprocket wheel or chain and is slotted or inset for the brackets 38. The block 30 is rabbeted at its upper part, as at 40 so hood 39 will be flush therewith. The brackets 38 are not only secured upon the top of block 30, as at 41, but they also overlap the hood and holdfast means, as at 42 and are common to the brackets and hood. The holdfast means 33 extend through slots 42 formed in the member 5 to permit of the block 30 being adjusted lengthwise of the seat to take up slack in chain 27.

Secured to member 5 and extending from the leading end thereof is a bifurcated member 43 adapted to have detachably connected thereto a coupler 44 for coupling a pair of cars together.

Preferably the gear ratio of the sprocket wheel with respect to the sprocket pinion is 2½ to 1. The width of the drive assembly with respect to that of the seat is such as to provide leg room at each side of the assembly.

To operate the car, the child seats upon member 5 directly over the drive truck 9 facing the drive assembly. One leg is placed at one side and the other leg at the other side of the drive assembly. The child's feet are placed on member 5 over truck 8. The child then grasps one of the handles with its right and the other handle with its left hand. The child now proceeds to rotate the discs thus propelling the car along the trucks. The car may be operated in either direction along the track by reversing the direction of rotations of the discs.

What I claim is:—

1. In an amusement apparatus, a mobile structure for propelling upon a track comprising a flat oblong member providing a seat and formed at its lengthwise center with a slot, a pivotal leading truck attached to said member and including two spaced pairs of wheels and an axle fixed to each pair of wheels, a pivotal drive truck attached to said member and including two spaced pairs of wheels and an axle fixed to each pair of wheels, one of the axles of the drive truck provided with a fixed sprocket pinion, a bodily adjustable drive assembly attached to and extending upwardly from said member intermediate the ends of the latter, said assembly spaced from the side edges of said member and including a hand power operated sprocket wheel having an operative drive connection leading therefrom through said slot to and for said sprocket pinion, and said member and assembly having coacting means to provide for the bodily adjusting of the assembly lengthwise of said member for taking up slack in said drive connection 2. In an amusement apparatus, a mobile structure for propelling upon a track comprising a flat oblong member providing a seat and formed at it lengthwise center with a slot, a bolster secured to said member, a leading truck pivotally connected with said bolster and including two spaced pairs of wheels and an axle fixed to each pair of wheels, a second bolster secured to said member, a drive truck pivotally connected with said second bolster and including two spaced pairs of wheels and an axle fixed to each pair of wheels, one of the axles of the drive truck provided with a fixed sprocket pinion, a bodily adjustable drive assembly attached to and extending upwardly from said member intermediate the ends of the latter, said assembly spaced from the side edges of said member and including a hand power operated sprocket wheel having an operative drive connection leading therefrom through said slot to and for said sprocket pinion, said assembly and member having coacting means to provide for the bodily adjusting of the assembly lengthwise of said member for taking up slack in said drive connection, and spaced means extending upwardly from the drive truck and coacting with said second bolster for limiting the movement of the drive truck in either direction.

3. In an amusement apparatus, a mobile structure for traveling upon a track comprising a flat oblong member providing a seat formed intermediate its ends with a lengthwise extending slot, a leading truck including two spaced pairs of wheels and an axle fixed to each pair of wheels, a pin for pivotally connecting said truck with said member, a drive truck including a leading axle, a follower axle, a driven sprocket pinion fixed to said leading axle and two pairs of wheels fixed to each of said axles, a pin for pivotally connecting the drive truck with said member, said pin pivotally connecting the drive truck with said member being located nearer said leading axle than to said follower axle, means carried by said drive truck for limiting its pivoting movement in either direction, and a bodily adjustable drive assembly attached to and extending upwardly from said member intermediate the ends of the latter, said assembly spaced from the side edges of said member and including a hand power operated sprocket wheel at its upper end and an operative drive connection leading from said wheel through said slot to and for said sprocket pinion, said member and assembly having coacting means to provide for the bodily adjusting of the assembly lengthwise of said member for taking up slack in said drive connection.

4. In an amusement apparatus, a mobile structure for traveling upon a track comprising a slotted seat forming member, a pair of wheeled trucks pivotally connected with said member and one including a driven axle provided with a fixed sprocket pinion, an upstanding drive assembly mounted upon said member intermediate the ends and spaced from the side edges of said member, said assembly including a hand powered driving means having an endless chain for rotating said pinion, said chain passing through said slot, and means for adjustably connecting said assembly to said member whereby the latter may be bodily adjusted lengthwise of said member for taking up slack in said chain.

5. In an amusement apparatus, a mobile structure comprising a rectangular seat forming member provided intermediate its ends and adjacent its sides with a lengthwise extending slot, a pair of spaced wheel trucks pivotally connected with said member and one including a driven axle provided with a sprocket pinion fixed thereto, an upstanding drive assembly including a foundation block mounted on and including a slot registering with the slot in said member, said assembly formed with a hood extending upwardly from the block end and a hand powered driving means within the hood supported from the block, said means including an endless chain passing through said slots to and for operating said pinion, and said block and member having coacting means for adjusting said drive assembly lengthwise with respect to said member for taking up slack on said chain.

6. In an amusement apparatus, a mobile structure comprising a horizontally disposed seat member provided intermediate its ends and adjacent its sides with a lengthwise extending slot, a pair of spaced trucks connected with said member and one including a driven axle provided with a sprocket pinion fixed thereto, an upstanding block mounted upon and having a slot registering with the slot in said member, a hood anchored to and extending upwardly from the block, an endless sprocket chain arranged in the hood, extending from the upper portion thereof, through said slots to and operating said pinion, a hand powered driving means for said chain arranged within the upper portion of and extended laterally from each side of the hood, upwardly extending supporting means for said assembly anchored at its lower end to the block, and said block and member having coacting means for bodily adjusting the block, hood and assembly relative to said member for taking up slack in said chain.

WILBERT F. BLUE.